United States Patent
Egawa et al.

(10) Patent No.: US 8,757,811 B2
(45) Date of Patent: Jun. 24, 2014

(54) PROJECTOR

(75) Inventors: Akira Egawa, Shiojiri (JP); Yasushi Tateno, Shiojiri (JP); Fumihide Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 546 days.

(21) Appl. No.: 13/074,355

(22) Filed: Mar. 29, 2011

(65) Prior Publication Data

US 2011/0234984 A1    Sep. 29, 2011

(30) Foreign Application Priority Data

Mar. 29, 2010 (JP) ................................. 2010-075014

(51) Int. Cl.
G03B 21/18 (2006.01)

(52) U.S. Cl.
CPC ...................................... G03B 21/18 (2013.01)
USPC .............................................. 353/61; 353/60

(58) Field of Classification Search
CPC ...... G03B 21/16; G03B 21/18; H04N 9/3197; H04N 9/3144
USPC ...................... 353/101, 69, 51–61; 349/58–60
See application file for complete search history.

(56) References Cited

U.S. PATENT DOCUMENTS

| | | |
|---|---|---|
| 6,334,686 B1 | 1/2002 | Shiraishi et al. |
| 6,443,575 B1 | 9/2002 | Miyamoto et al. |
| 6,481,854 B1 | 11/2002 | Sugawara et al. |
| 7,073,912 B2 * | 7/2006 | Yanagisawa et al. ........... 353/61 |
| 2004/0109142 A1 | 6/2004 | Gishi et al. |
| 2007/0019168 A1 | 1/2007 | Nakagawa et al. |
| 2008/0246924 A1 | 10/2008 | Okoshi |
| 2008/0252858 A1 | 10/2008 | Zheng et al. |
| 2011/0019159 A1 | 1/2011 | Egawa et al. |
| 2011/0025984 A1 | 2/2011 | Takagi et al. |
| 2011/0032486 A1 | 2/2011 | Egawa et al. |

FOREIGN PATENT DOCUMENTS

| | | |
|---|---|---|
| JP | A-2000-231154 | 8/2000 |
| JP | 2001-133885 A | 5/2001 |
| JP | A-2001-188305 | 7/2001 |
| JP | A-2001-281613 | 10/2001 |
| JP | B2-4030208 | 1/2008 |
| JP | 2008-257181 A | 10/2008 |
| TW | I321261 B | 3/2010 |

OTHER PUBLICATIONS

Jun. 16, 2011 Extended European Search Report issued in European Patent Application No. 11158925.5.

* cited by examiner

*Primary Examiner* — Francis M Legasse, Jr.
*Assistant Examiner* — Jerry Brooks
(74) *Attorney, Agent, or Firm* — Oliff PLC

(57) ABSTRACT

A projector includes a plurality of light modulation devices and a cooling device. The cooling device includes a cooling fan configured to introduce and discharge air, and a duct configured to guide air received from the cooling fan toward the plural light modulation devices. The duct includes a first duct portion configured to allow the air to flow through the light modulation devices from sides of the light modulation devices, and a second duct portion which communicates with the first duct portion and guides a part of the air flowing through the first duct portion toward devices other than the light modulation devices.

12 Claims, 10 Drawing Sheets

PROJECTOR

This application claims priority to JP 2010-075014 filed in Japan on Mar. 29, 2010. The entire disclosure is hereby incorporated by reference in its entirety.

BACKGROUND

1. Technical Field

The present invention relates to a projector.

2. Related Art

A projector which includes three light modulation devices for modulating three color lights in R (red), G (green), and B (blue) according to image information such as liquid crystal panels, and a cooling device for cooling the light modulation devices is known (for example, see JP-A-2001-281613).

The projector disclosed in JP-A-2001-281613 has the following cooling device for reducing the thickness of the projector.

The cooling device provided on the projector includes a sirocco fan disposed in the vicinity of the side of a projection lens, and a duct (channel) for guiding air discharged from the sirocco fan toward the respective light modulation devices.

The duct is a U-shaped component which surrounds three light entrance surfaces of a cross dichroic prism in the plan view, the prism is provided to combine the respective color lights modulated by the corresponding light modulation devices.

The air discharged from the sirocco fan and traveling within the duct sequentially passes through the light modulation devices from the sides of the light modulation devices in the order of the positions of the light modulation devices disposed adjacent to one another so as to cool the three light modulation devices.

According to the cooling device disclosed in JP-A-2001-281613, however, the bended structure of the duct and the small channel area of the duct narrowed by the light modulation devices contained within the duct increase the pressure loss within the duct. In this case, the static pressure within the duct rises, producing such a condition that a sufficient amount of air discharged from the sirocco fan is difficult to be securely supplied to the inside of the duct.

Particularly, since only a small amount of air is supplied to the light modulation device disposed in the most downstream part of the channel of the duct in the three light modulation devices, the temperature of the air supplied to this light modulation device rises. As a result, the temperature of the corresponding light modulation device is difficult to be decreased. Accordingly, effective cooling for the three light modulation devices cannot be achieved.

SUMMARY

An advantage of some aspects of the invention is to provide a projector capable of effectively cooling light modulation devices.

A projector according to an aspect of the invention includes a plurality of light modulation devices, and a cooling device. The cooling device includes a cooling fan configured to introduce and discharge air, and a duct configured to guide air received from the cooling fan toward the plural light modulation devices. The duct includes a first duct portion configured to allow the air to flow through the two light modulation devices from sides of the two light modulation, and a second duct portion which communicates with the first duct portion and guides a part of the air flowing through the first duct portion toward the devices other than the two light modulation devices.

According to this structure, the duct for guiding air toward the plural light modulation devices has the first duct portion which allows the air to flow through the two light modulation devices.

In this case, the channel length of the first duct portion and the number of the light modulation devices disposed on the first duct portion become smaller than the corresponding length and number of a duct in related art. Thus, the static pressure within the first duct portion decreases, securing a sufficient amount of air discharged from the cooling fan toward the first duct portion. Accordingly, the two light modulation devices can be effectively cooled by the air flowing within the first duct portion.

Moreover, the duct has the second duct portion branched from the first duct portion as a duct portion added to the first duct portion to guide a part of the air flowing through the first duct portion toward the light modulation device or devices other than the two light modulation devices.

In this case, the outside air can be directly introduced through the second duct portion toward the devices other than the two light modulation devices. Thus, the devices other than the two light modulation devices can be effectively cooled as well.

Accordingly, all the light modulation devices can be effectively cooled by air flowing through the first duct portion and the second duct portion.

It is preferable that the projector of the above aspect of the invention further includes a color combining device that has a plurality of light entrance surfaces that respective color lights modulated by the plural light modulation devices, and combines the respective color lights. The second duct portion is disposed so as to face an end surface of the color combining device crossing the plurality of light entrance surfaces.

In the color combining device, the space around the end surface of the color combining device crossing the plurality of light entrance surfaces (the upper end or lower end of the color combining device) often becomes a dead space produced by the size difference between the color combining device and the projection lens (the projection lens is larger than the color combining device) as a space where other components are not disposed.

According to this structure of the above aspect of the invention, however, the second duct portion is disposed so as to face the end surface of the color combining device crossing the plurality of light entrance surfaces so as to be positioned within the dead space, Thus, the duct does not mechanically interfere with other components even when the duct is provided within the projector, which eliminates the necessity of changing the layout of those components. Particularly, thickness reduction of the projector is not prevented when the second duct portion is disposed in the dead space.

It is preferable that the plural light modulation devices having a red light modulation device for modulating red light, a green light modulation device for modulating green light, and a blue light modulation device for modulating blue light in the projector according to the above aspect of the invention. In this case, the first duct portion allows air to flow through the green light modulation device and blue light modulation device. The second duct portion guides air to the red light modulation device.

According to this structure, the green light modulation device and the blue light modulation device are cooled by the air flowing through the first duct portion, and the red light modulation device is cooled by the air supplied through the second duct portion.

For example, the first and second duct portions are constructed such that the amount of air flowing through the first duct portion is larger than the amount of air flowing through the second duct portion.

In this case, the red light modulation device which generates a small quantity of heat and thus requires only a small amount of air for cooling is cooled by the small amount of air supplied from the second duct portion. On the other hand, the green light modulation device and the blue light modulation device each of which generates a large quantity of heat and thus requires a large amount of air are cooled by the large amount of air flowing through the first duct portion.

Accordingly, the respective light modulation devices can be efficiently cooled according to the quantities of heat generated from the light modulation devices.

It is preferable that the green light modulation device and the blue light modulation device are disposed in the order of the blue light modulation device and the green light modulation device from an upstream channel side of the first duct portion in the projector of the above aspect of the invention.

Generally, the amount of heat generated from the green light modulation device is larger than the amount of heat generated from the blue light modulation device. However, the cooling target temperature of the blue light modulation device is often set at a temperature lower than the cooling target temperature of the green light modulation device.

According to this structure of the above aspect of the invention, the blue light modulation device is disposed on the upstream channel side of the first duct portion, while the green light modulation device is disposed on the downstream channel side.

Thus, the temperature of the blue light modulation device requiring the low target temperature can be decreased to a temperature close to the target temperature by using air having a relatively low temperature (air not heated by the light modulation devices). Also, the temperature of the green light modulation device whose target temperature is higher than that of the blue light modulation device can be decreased to a temperature close to the target temperature by using the air having passed through the blue light modulation device.

Accordingly, the blue light modulation device and the green light modulation device can be efficiently cooled.

It is preferable that the second duct portion has a first branch duct portion to guide air to the devices other than the two light modulation devices, and a second branch duct portion to guide air to a downstream channel side light modulation device of the two light modulation devices provided on the first duct portion in the projector of the above aspect of the invention.

According to this structure, the second duct portion has the first branch duct portion and the second branch duct portion. Thus, the downstream channel side light modulation device provided on the first duct portion can be cooled by both the air flowing through the first duct portion and the air flowing through the second branch duct portion.

For example, when the green light modulation device is disposed on the downstream channel part of the first duct portion, the green light modulation device requires a large quantity of air for cooling. In this case, the green light modulation device can be effectively cooled by the second duct portion having this structure.

It is preferable that the projector of the above aspect of the invention further includes a light shield plate that separates a downstream channel side light modulation device of the two light modulation devices provided on the first duct portion from the devices other than the two light modulation devices.

According to this structure which includes the light shield plate, the air having passed through the first duct portion, that is, the air having cooled the two light modulation devices provided on the first duct portion and thus having a high temperature does not flow toward devices other than the two light modulation devices. Thus, the temperature of devices other than the two light modulation devices is not raised by the air having passed through the first duct portion and having a high temperature, allowing devices other than the two light modulation devices to be effectively cooled by the air flowing through the second duct portion.

It is preferable that the second duct portion is provided in a state that a flowing direction of air supplied through the second duct portion toward the devices other than the two light modulation devices crosses the flowing direction of air having passed through the two light modulation devices via the first duct portion in the projector of the above aspect of the invention.

According to this structure, the second duct portion is disposed in the above condition. In this case, flow of the air having passed through the first duct portion and thus having a high temperature in the direction toward the devices other than the two light modulation devices can be blocked by the air supplied via the second duct portion. Thus, temperature increase of the devices other than the two light modulation devices by the air having a high temperature after flowing through the first duct portion can be avoided, allowing the devices other than the two light modulation devices to be effectively cooled by the air flowing from the second duct portion.

It is preferable that a communication port formed on the second duct portion to communicate with the first duct portion is provided in such a condition that a part of the communication port overlaps with the upstream channel side light modulation device of the two light modulation devices provided on the first duct portion in the plan view as viewed in the thickness direction of the projector in the projector of the above aspect of the invention.

According to this structure which has the communication port at the above position, air before heated by the two light modulation devices disposed on the first duct portion can be introduced into the second duct portion via the communication port. Thus, air having a relatively low temperature can be supplied to the devices other than the two light modulation devices, allowing the devices other than the two light modulation devices to be effectively cooled.

Since the communication port is disposed at the above position, the second duct portion can be easily located within the dead space mentioned above (above or below the color combining device). Thus, the necessity of changing the layout of other components is eliminated, and the thickness reduction of the projector is not prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
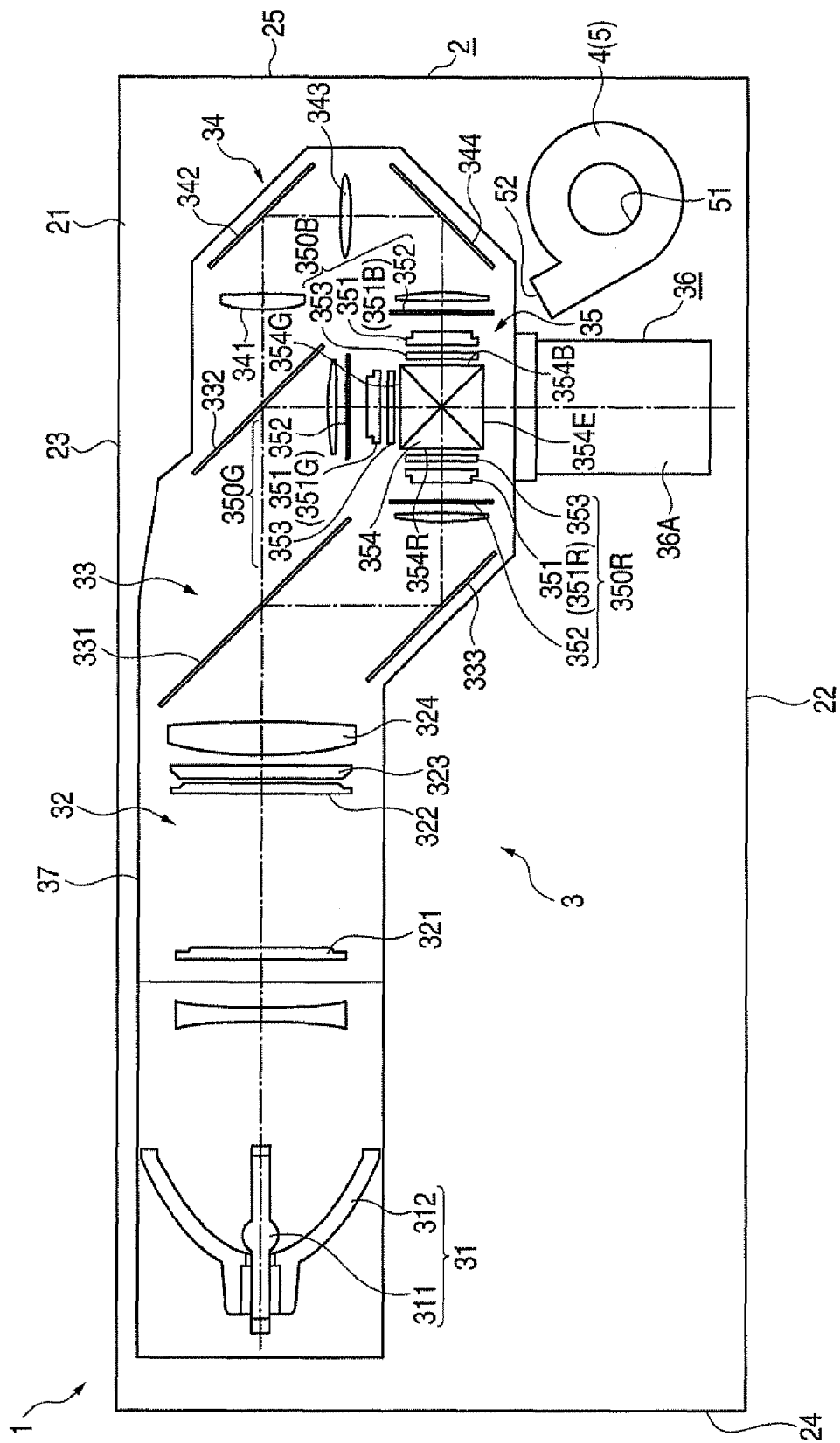
FIG. 1 is a plan view schematically illustrating the internal structure of a projector according to a first embodiment.

A first embodiment according to the invention is hereinafter described with reference to the drawings, Structure of Projector FIG. 1 is a plan view schematically illustrating the internal structure of a projector 1.

In the following description, the side where a projection lens 36 described later is disposed is referred to as the "front side", and the side opposite to the front side is referred to as the "rear side" for convenience of explanation.

The projector 1 modulates light according to image information and projects the modulated light on a screen (not shown). As illustrated in FIG. 1, the projector 1 includes an external housing 2 constituting the external case, and an optical unit 3 and a cooling device 4 (only a part of the components of the cooling device 4 (cooling fan 5) is shown in FIG. 1) disposed inside the external housing 2.

Structure of External Housing

As illustrated in FIG. 1, the external housing 2 has a substantially parallelepiped shape including a top surface (not shown), a bottom surface 21, side surfaces 22 through 25 (including a front surface 22 as the front side surface and a rear surface 23 as the rear side surface).

Structure of Optical Unit

The optical unit 3 is a unit for modulating light according to image information (image signal) and projecting the modulated light. As illustrated in FIG. 1, the optical unit 3 has a substantially L shape in the plan view which extends along the rear surface 23 and has one end projecting toward the front surface 22.

As illustrated in FIG. 1, the optical unit 3 includes: a light source device 31 which has a light source lamp 311 and a reflector 312; an illumination device 32 which has lens arrays 321 and 322, a polarization converting element 323, and a superposing lens 324; a color separation device 33 which has dichroic mirrors 331 and 332, and a reflection mirror 333; a relay device 34 which has an entrance side lens 341, a relay lens 343, and reflection mirrors 342 and 344; an optical device 35 which has three liquid crystal panels 351 as light modulation devices, three entrance side polarizer 352, three exit side polarizer 353, and a cross dichroic prism 354 as a color combining device; the projection lens 36 as a projection device; and an optical component housing 37 which accommodates the respective components 31 through 35 and supports the projection lens 36.

According to the optical unit 3 thus constructed, light emitted from the light source device 31 and transmitted through the illumination device 32 is separated into three color lights in R, G, and B by the color separation device 33. The separated color lights are modulated by the corresponding liquid crystal panels 351 according to image information. The modulated color lights are combined by the prism 354 and projected through the projection lens 36 onto the screen.

In FIG. 1, the liquid crystal panel 351 for R light, the entrance side polarizer 352 for R light, and the exit side polarizer 353 for R light are collectively referred to as an R component 350R, and the components for G light and the components for B light are similarly referred to as a G component 350G and a B component 350B, respectively. This applies to the other figures referred to later.

In addition, the liquid crystal panels 351 for R, G, and B lights in FIG. 1 are referred to as a liquid crystal panel 351R (red light modulation device), a liquid crystal panel 351G (green light modulation device), and a liquid crystal panel 351B (blue light modulation device), respectively. This applies to the other figures referred to later.

Structure of Cooling Device

Figure 2:
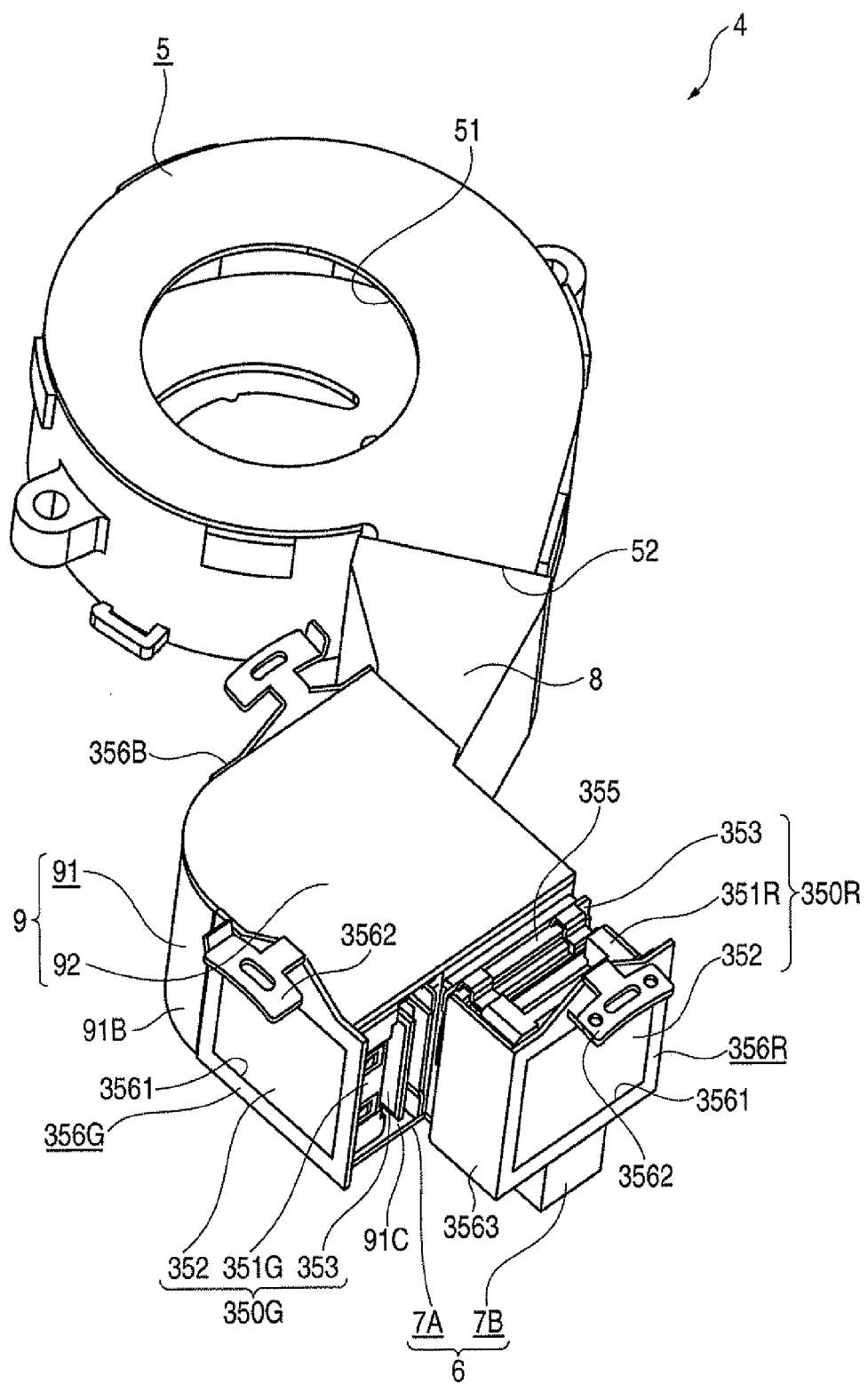
FIG. 2 schematically illustrates the structure of a cooling device according to the first embodiment.
Figure 3:
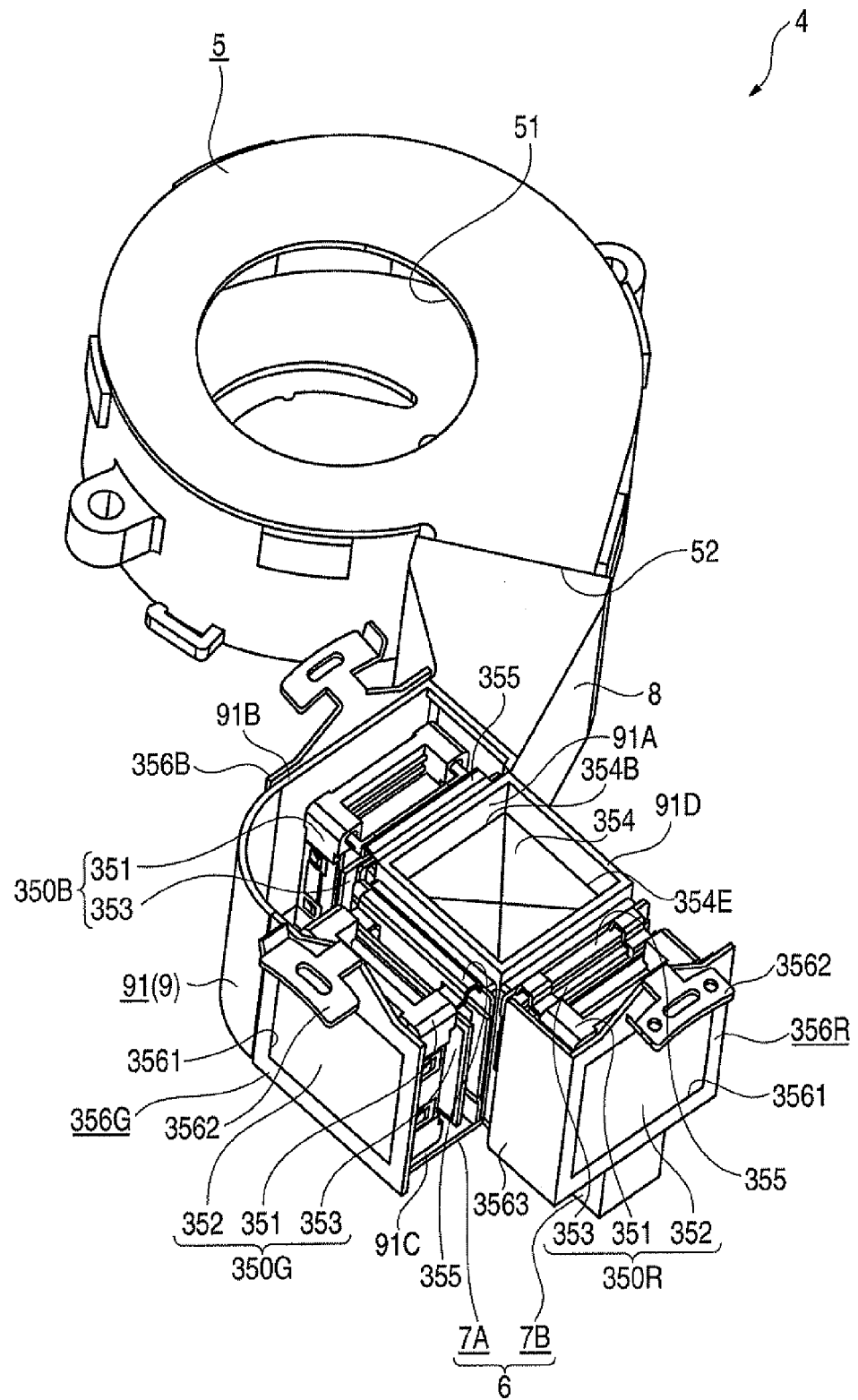
FIG. 3 schematically illustrates the structure of the cooling device according to the first embodiment.

FIGS. 2 and 3 schematically illustrate the structure of the cooling device 4. More specifically, FIG. 2 is a perspective view of the rear side of the cooling device 4 as viewed from above (top surface side of the external housing 2), and FIG. 3 illustrates the cooling device 4 shown in FIG. 2 from which a cover 92 is removed from a duct 6.

As illustrated in FIG. 1, the cooling device 4 is disposed in the vicinity of the projection lens 36, and supplies air to the optical device 35 to cool the optical device 35. As illustrated in FIGS. 1 through 3, the cooling device 4 includes the cooling fan 5 and the duct 6 (FIGS. 2 and 3).

Structure of Cooling Fan

The cooling fan 5 is constituted by a so-called sirocco fan which has a plurality of vanes curved toward the front with respect to the fan rotation direction, and is disposed on the right side with respect to the projection lens 36 as viewed from the front side.

More specifically, as illustrated in FIGS. 2 and 3, the cooling fan 5 is disposed in such a condition that an intake port 51 through which air is introduced faces to above, and that a discharge port 52 through which air is discharged faces to the left with inclination toward the rear (toward the front surface of the B component 350B).

Structure of Duct

Figure 4:
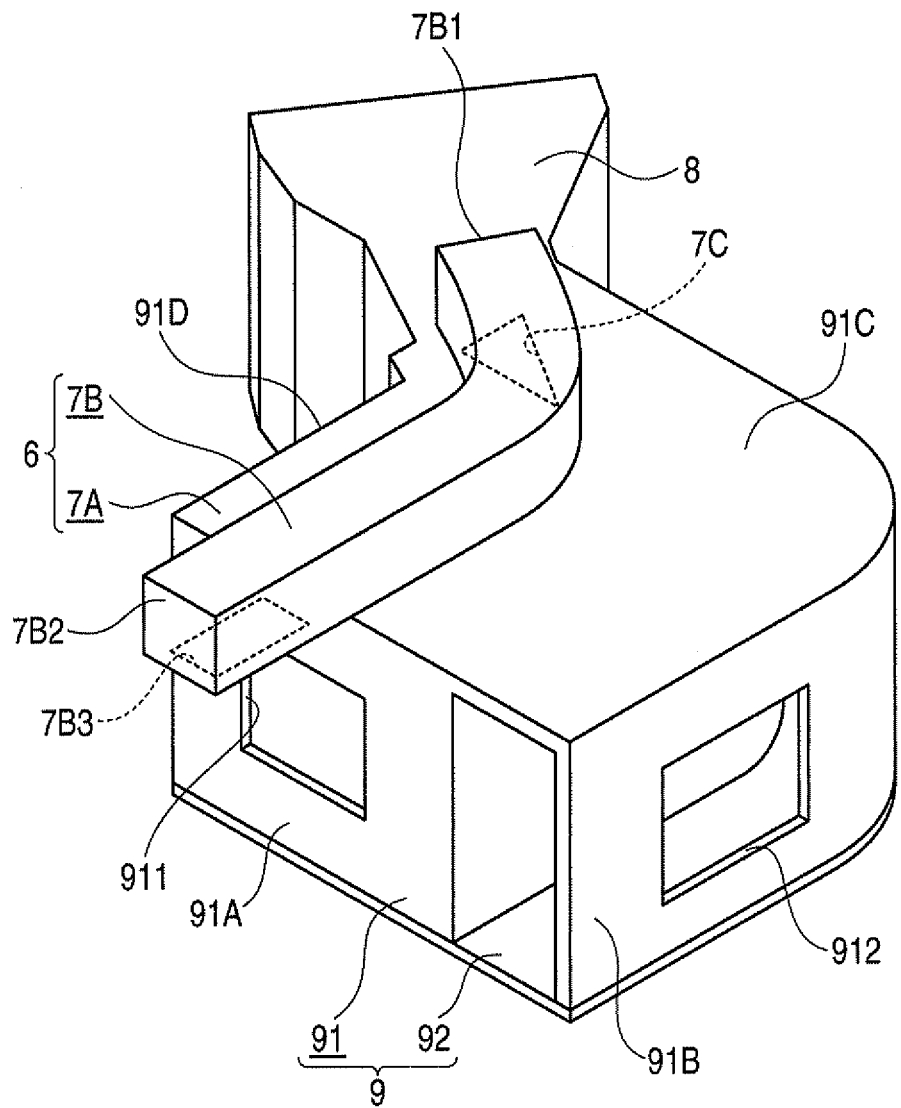
FIG. 4 schematically illustrates the structure of a duct according to the first embodiment.

FIG. 4 schematically illustrates the structure of the duct 6. More specifically, FIG. 4 is a perspective view of the rear side of the duct 6 as viewed from below (from the bottom surface 21 side).

The duct 6 supplies air discharged from the cooling fan 5 toward the respective components 350R, 350G, and 350B. As illustrated in FIGS. 2 through 4, the duct 6 includes a main duct portion 7A as a first duct portion, and a sub duct portion 7B as a second duct portion.

Structure of Main Duct Portion

As illustrated in FIGS. 2 through 4, the main duct portion 7A has an introduction side duct section 8 and a main channel forming section 9.

As can be seen from FIGS. 2 through 4, the introduction side duct section 8 has a pipe-shaped component which has one end (introduction port through which air is introduced into the duct 6) connecting with the discharge port 52 of the cooling fan 5 and extending in the discharging direction of air from the discharge port 52. The other end of the introduction side duct section 8 is connected with the main channel forming section 9 to communicate with the inside of the main channel forming section 9.

The main channel forming section 9 supplies air discharged from the cooling fan 5 and released from the introduction side duct section 8 toward the B component 350B and the G component 350G such that the air flows through the B component 350B and the G component 350G in this order. As illustrated in FIGS. 2 through 4, the main channel forming section 9 has a main body 91 and the cover 92 (see FIGS. 2 and 4).

As illustrated in FIGS. 2 through 4, the main body 91 is a container-shaped component having an inner peripheral wall 91A (FIGS. 3 and 4), an outer peripheral wall 91B, and a bottom wall 91C.

The inner peripheral wall 91A is a substantially U-shaped component in the plan view which surrounds entrance surfaces 354R, 354G, and 354B of the prism 354 for receiving the respective color lights in R, G, and B (see FIGS. 1 and 3).

The inner peripheral wall 91A has three openings 911 (see FIG. 4 which shows only the opening 911 for R light) through which the respective color lights in R, G, and B having passed through the respective components 350R, 350G, and 350B are supplied to the prism 354.

As illustrated in FIGS. 2 and 3, the liquid crystal panels 351 and the exit side polarizer 353 are attached to the inner peripheral wall 91A via support members 355 so as to face the entrance surfaces 354R, 354G, and 354B.

The front side ends of the inner peripheral wall 91A are connected to each other by a connection wall 91D (see FIGS. 3 and 4) to cover an exit surface 354E (FIGS. 1 and 3) through which an image synthesized by the prism 354 is released.

The connection wall 91D has an opening 913 (see FIG. 5) through which light synthesized by the prism 354 is released.

The connection wall 91D has a function of releasing only the light synthesized by the prism 354 through the opening 913, and blocking unnecessary light (leak light) such that entrance of the unnecessary light into the projection lens 36 can be prevented.

The outer peripheral wall 91B is disposed on the entrance sides of the respective color lights G and B with respect to the inner peripheral wall 91A, and has a substantially L shape in the plan view extending substantially in parallel with the inner peripheral wall 91A.

The outer peripheral wall 91B has two openings 912 (see FIG. 4 which shows only the opening 912 for G light) through which the respective color lights in G and B received from the corresponding entrance side polarizer 352 are released.

As illustrated in FIGS. 2 and 3, the two entrance side polarizer 352 are disposed on the outer peripheral wall 91B in such positions as to close the two openings 912 via the corresponding polarizer support members 356G and 356B.

As can be seen from FIGS. 2 and 3, the respective polarizer support members 356G and 356B have the same structure. Thus, only the polarizer support member 356G is herein explained.

The polarizer support member 356G is constituted by a plate body having an opening 3561 at the center. The entrance side polarizer 352 is attached to the polarizer support member 356G in such a position as to close the opening 3561.

As illustrated in FIGS. 2 and 3, a position control portion 3562 bended toward the light entrance side and curved in an upward convex shape is provided at the upper end of the polarizer support member 356G.

More specifically, the position control portion 3562 is curved to have a circular-arc shape whose center is located over the optical axis of the color light entering the entrance side polarizer 352.

The position control portion 3562 is placed on a control receiving portion provided on the upper surface of the optical component housing 37 in such a manner as to freely slide on the control receiving portion, which is not specifically shown in the figures. The entrance side polarizer 352 rotates around the optical axis of the entering color light in accordance with the sliding of the position control portion 3562 on the control receiving portion. Thus, the polarizer support member 356G has a function of controlling the position of the entrance side polarizer 352 as well as the function of supporting the entrance side polarizer 352.

As can be seen from FIGS. 2 and 3, the polarizer support member 356R for R light has a structure substantially similar to the structures of the polarizer support members 356G and 356B explained above, but is different from those in the following point.

According to the polarizer support member 356R, a substantially rectangular light shield portion 3563 as a light shield plate bended toward the light exit side is provided at the left end of the polarizer support member 356R as viewed from the entrance side of the R light as illustrated in FIGS. 2 and 3.

Thus, under the condition in which the polarizer support member 356R is provided, the liquid crystal panel 351G (G component 350G) and the liquid crystal panel 351R (R component 350R) are separated from each other by the light shield portion 3563.

As illustrated in FIG. 4, the bottom wall 91C connects the lower ends of the inner peripheral wall 91A and the outer peripheral wall 91B, and extends in the horizontal direction along the bottom surface 21 to close the lower part of the prism 354.

Structure of Sub Duct Portion

As illustrated in FIG. 4, the sub duct portion 7B is attached to the outside surface of the bottom wall 91C to guide a part of air flowing through a channel C2 within the main duct portion 7A (see FIG. 5) toward the R component 350R.

The sub duct portion 7B is constituted by a hollow component which extends from one end 7B1 (FIG. 4) to the other end 7B2 (FIG. 4) along the outside surface of the bottom wall 91C.

More specifically, the end 7B1 is positioned at the front side end of the B component 350B in the plan view as viewed in the vertical direction. The sub duct portion 7B extends from the end 7B1 toward approximately the center of the prism 354 in the plan view as viewed in the vertical direction, and further extends linearly in the direction perpendicular to the entrance surface 354R. In this arrangement, the end 7B2 is positioned approximately at the center of the R component 350R in the front-rear direction (direction from the front side to the rear side) in the plan view as viewed in the vertical direction.

According to the sub duct portion 7B thus constructed, the upper surface of the end 7B1 communicates with the inside of the main duct portion 7A (channel C2) via a communication port 7C as illustrated in FIG. 4.

Figure 5:
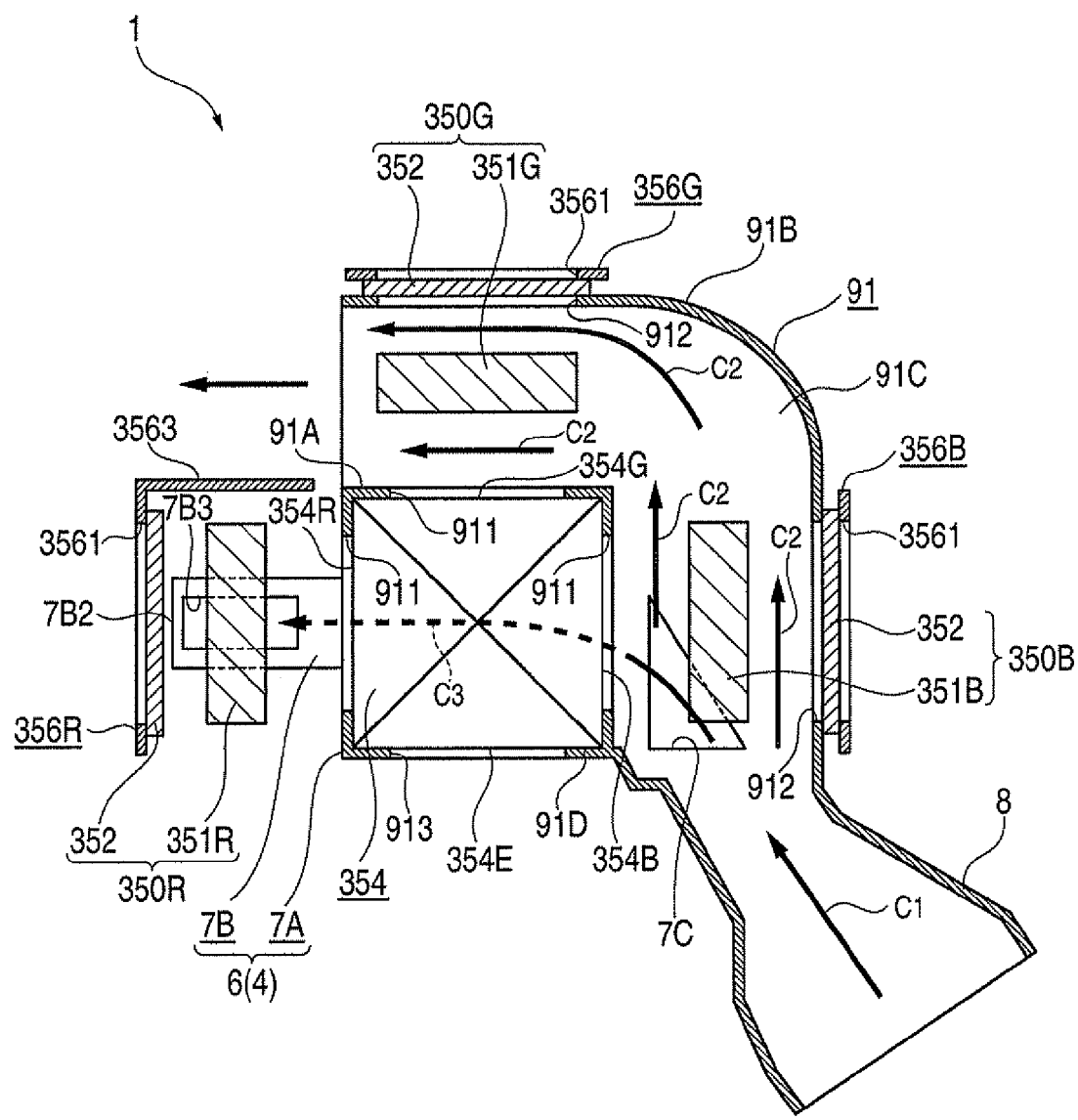
FIG. 5 illustrates channels of the duct according to the first embodiment.

The communication port 7C has a substantially right-angled triangular shape which has an oblique side extending in the air discharge direction from the cooling fan 5, and the other sides extending substantially in parallel with the entrance surface 354B and the exit surface 354E in the plan view as viewed in the vertical direction (see FIG. 5).

A part of the communication port 7C overlaps with the liquid crystal panel 351B in the plan view as viewed in the vertical direction (see FIG. 5).

Moreover, as illustrated in FIG. 4, the upper surface of the end 7B2 of the sub duct portion 7B has an outlet port 7B3 through which air introduced from the communication port 7C is discharged to the outside.

Channels of Duct

Figure 6:
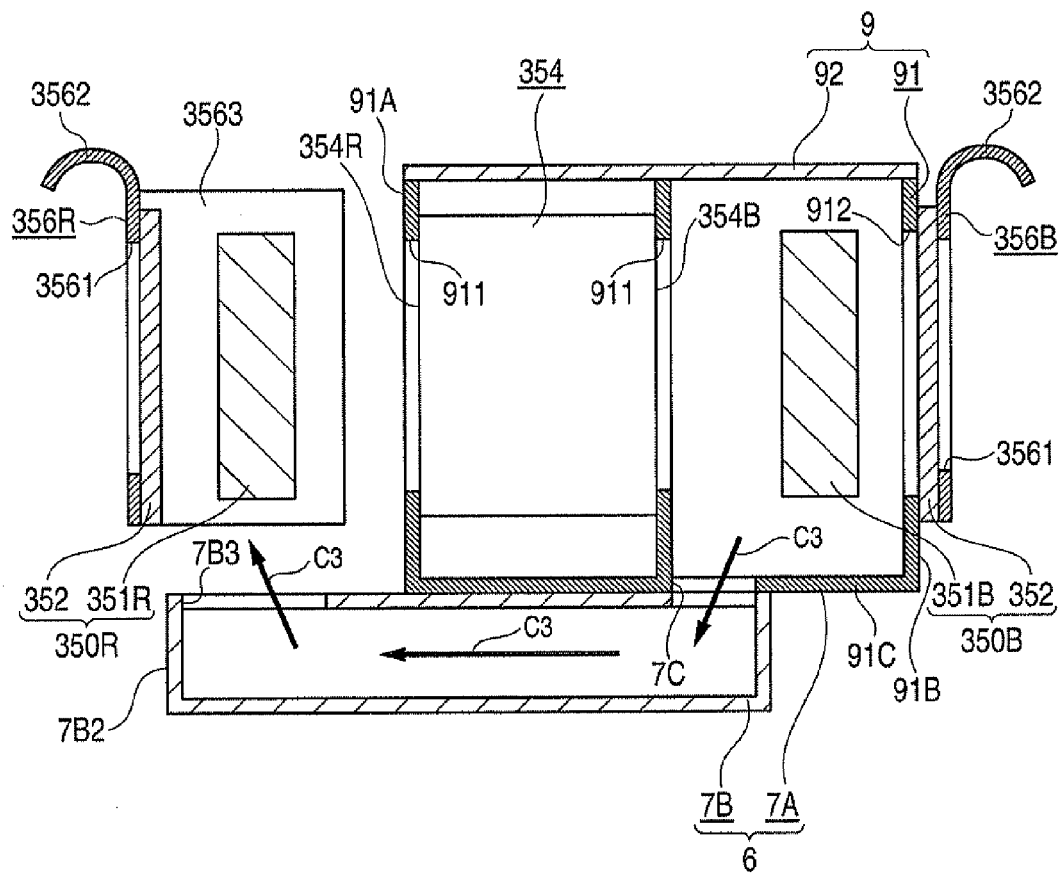
FIG. 6 illustrates the channel of the duct according to the first embodiment.

FIGS. 5 and 6 illustrate the channels of the duct 6. More specifically, FIG. 5 shows the cross section of the duct 6 cut along the horizontal plane passing through the inner peripheral wall 91A and the outer peripheral wall 91B as viewed from above, and FIG. 6 shows the cross section of the duct 6 cut along the vertical plane passing through the sub duct portion 7B as viewed from the front.

FIGS. 5 and 6 do not show the respective exit side polarizer 353 and the respective support members 355 constituting the optical device 35 for convenience of explanation.

The channels of the duct 6 mentioned above are now explained.

As illustrated in FIG. 5, channels C1 and C2 are formed within the main duct portion 7A by closing the upper part of the main body 91 with the cover 92.

In this structure, air discharged from the cooling fan 5 flows along the channel C1 within the introduction side duct section 8 to be introduced into the main duct portion 7A and supplied toward the side (front side end) of the liquid crystal panel 351B.

The air introduced into the main duct portion 7A passes through the B component 350B and the G component 350G in this order from the sides of the components 350B and 350G along the L-shaped channel C2 in the plan view. The air traveling along the channel C2 flows through the light entrance sides and the light exit sides of the liquid crystal panels 351B and 351G to cool the respective components 350B and 350G.

Furthermore, as illustrated in FIGS. 5 and 6, a channel C3 is formed within the sub duct portion 7B by connection between the sub duct portion 7B and the channel C2 via the communication port 7C.

In this structure, a part of the air introduced into the main duct portion 7A and passing through the channel C2 is branched into the channel C3 from the channel C2 via the communication port 7C to be guided toward the lower part of the R component 350R and discharged to the outside of the sub duct portion 7B through the outlet port 7B3 as illustrated in FIGS. 5 and 6.

The air discharged to the outside of the sub duct portion 7B is supplied to the lower end of the liquid crystal panel 351R, and flows through the light entrance side and the light exit side of the liquid crystal panel 351R in the upward direction from below to cool the R component 350R.

According to the first embodiment, the following advantages can be offered.

In this embodiment, the duct 6 for guiding air toward the respective components 350R, 350G, and 350B has the main duct portion 7A along which air flows toward the two liquid crystal panels 351B and 351G in this order from the sides of the liquid crystal panels 351B and 351G.

In this case, the channel length of the main duct portion 7A and the number of the liquid crystal panels 351 disposed on the main duct portion 7A become smaller than the corresponding the channel length and number of the liquid crystal panels in related art. Thus, the static pressure within the main duct portion 7A decreases, securing a sufficient amount of air discharged from the cooling fan 5 toward the main duct portion 7A. Accordingly, the respective components 350G and 350B can be effectively cooled by the air flowing along the channels C1 and C2.

The duct 6 has the sub duct portion 7B branched from the main duct portion 7A as a duct added to the main duct portion 7A to guide a part of air flowing along the channel C2 toward the R component 350R.

In this structure, the air introduced from the sub duct portion 7B can be supplied toward the R component 350R to effectively cool the R component 350R as well.

Accordingly, all the components 350R, 350G, and 350B can be effectively cooled by air flowing through the main duct portion 7A and the sub duct portion 7B.

Moreover, the sub duct portion 7B is positioned in the space below the prism 354 as a dead space. In this case, the duct 6 does not mechanically interfere with other components even when the duct 6 is provided within the projector 1, which eliminates the necessity of changing the layout of those components. Particularly, thickness reduction of the projector 1 is not prevented when the sub duct portion 7B is disposed in the dead space.

According to the structures of the main duct portion 7A and the sub duct portion 7B in this embodiment, the amount of air flowing through the main duct portion 7A becomes larger than the amount of air flowing through the sub duct portion 7B.

In this arrangement, the G component 350G and the B component 350B are provided on the main duct portion 7A, and the R component 350R is cooled by the air supplied from the sub duct portion 7B.

In this case, the R component 350R which generates a small quantity of heat and thus requires only a small amount of air for cooling is cooled by the small amount of air supplied from the sub duct portion 7B. On the other hand, the respective components 350B and 350G each of which generates a large quantity of heat and thus requires a large amount of air are cooled by the large amount of air flowing through the main duct portion 7A.

Accordingly, the respective components 350R, 350G, and 350B can be efficiently cooled in accordance with the respective quantities of heat generated from the components 350R, 350G, and 350B.

According to the structure of the main duct portion 7A, the B component 350B is disposed on the upstream part of the channel C2, and the G component 350G is disposed on the downstream part of the channel C2.

In this arrangement, the temperature of the liquid crystal panel 351B (B component 350B) requiring a lower target temperature can be decreased to a temperature close to the target temperature by using air having a relatively low temperature (air not heated by the components 350B and 350G). Also, the temperature of the liquid crystal panel 351G (G component 350G) whose target temperature is higher than that of the liquid crystal panel 351B can be decreased to a temperature close to the target temperature by using the air having passed through the B component 350B.

Accordingly, the G component 350G and the B component 350B can be efficiently cooled.

Since the polarizer support member 356R has the light shield portion 3563, the air having passed through the main duct portion 7A, that is, the air having cooled the G component 350G and the B component 350B and thus having a high temperature does not flow toward the R component 350R. Thus, the temperature of the R component 350R is not increased by the air having passed through the main duct portion 7A and having a high temperature, allowing the R component 350R to be cooled only by the air flowing through the sub duct portion 7B.

The communication port 7C is constructed such that a part of the communication port 7C overlaps with the liquid crystal panel 351B in the plan view as viewed in the vertical direction. In this case, air before being heated by the respective components 350G and 350B can be introduced into the sub duct portion 7B via the communication port 7C. Thus, air having a relatively low temperature can be supplied to the R component 350R, allowing the R component 350R to be effectively cooled.

Since the communication port 7C is disposed at the position explained above, the sub duct portion 7B can be easily located within the dead space mentioned above (below the prism 354). Thus, the necessity of changing the layout of other components is eliminated, and the thickness reduction of the projector 1 is not prevented.

Second Embodiment

A second embodiment according to the invention is hereinafter described with reference to the drawings.

In the following description, the same reference numbers are given to the same structures and parts as those in the first embodiment, and the same detailed explanation is simplified or not repeated.

Figure 7:
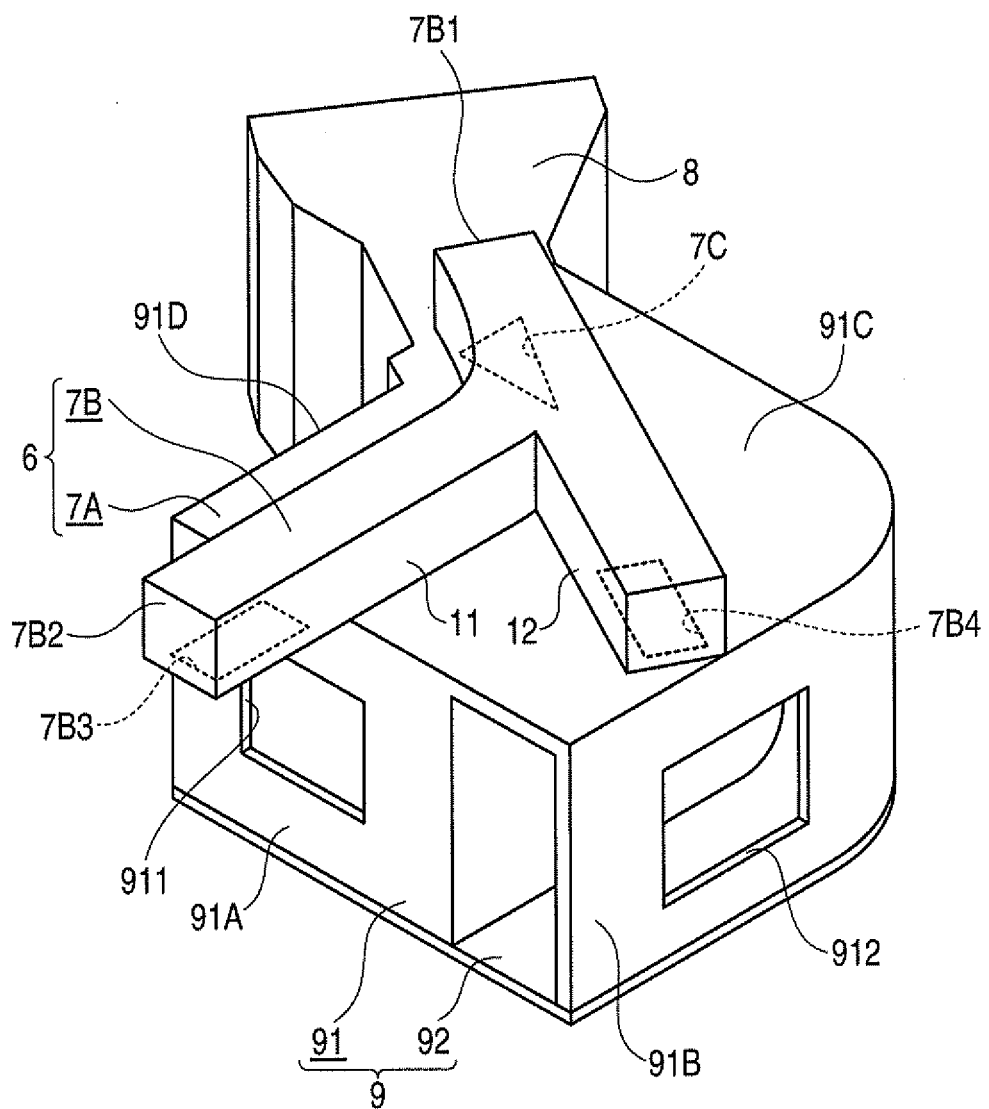
FIG. 7 schematically illustrates the structure of a duct according to a second embodiment.

FIG. 7 schematically illustrates the structure of the duct 6 in the second embodiment. More specifically, FIG. 7 is a perspective view of the rear side of the duct 6 as viewed from below.

The structure in this embodiment is the same as that in the first embodiment except that the construction of the sub duct portion 7B is different from the corresponding construction in the first embodiment.

More specifically, the sub duct portion 7B in the second embodiment is branched into two parts of a first branch duct portion 11 and a second branch duct portion 12 in the direction from the end 7B1 toward the other end as illustrated in FIG. 7.

As can be seen from FIG. 7, the first branch duct portion 11 has a structure similar to that of the end 7B2 shown in the first embodiment, and has the outlet port 7B3 (hereinafter referred to as the first outlet port 7B3).

The second branch duct portion 12 illustrated in FIG. 7 extends almost linearly from the end 7B1 to the substantially center of the position of the G component 350G in the left-right direction (left-right direction as viewed from the front side) in the plan view as viewed in the vertical direction.

As illustrated in FIG. 7, the upper surface of the end of the second branch duct portion 12 communicates with the inside of the main duct portion 7A (channel C2) via a second outlet port 7B4.

The second outlet port 7B4 is formed substantially at the center of the liquid crystal panel 351G in the left-right direction (left-right direction as viewed from the front side) in the plan view as viewed in the vertical direction.

The channels of the duct 6 in the second embodiment are now explained.

Figure 8:
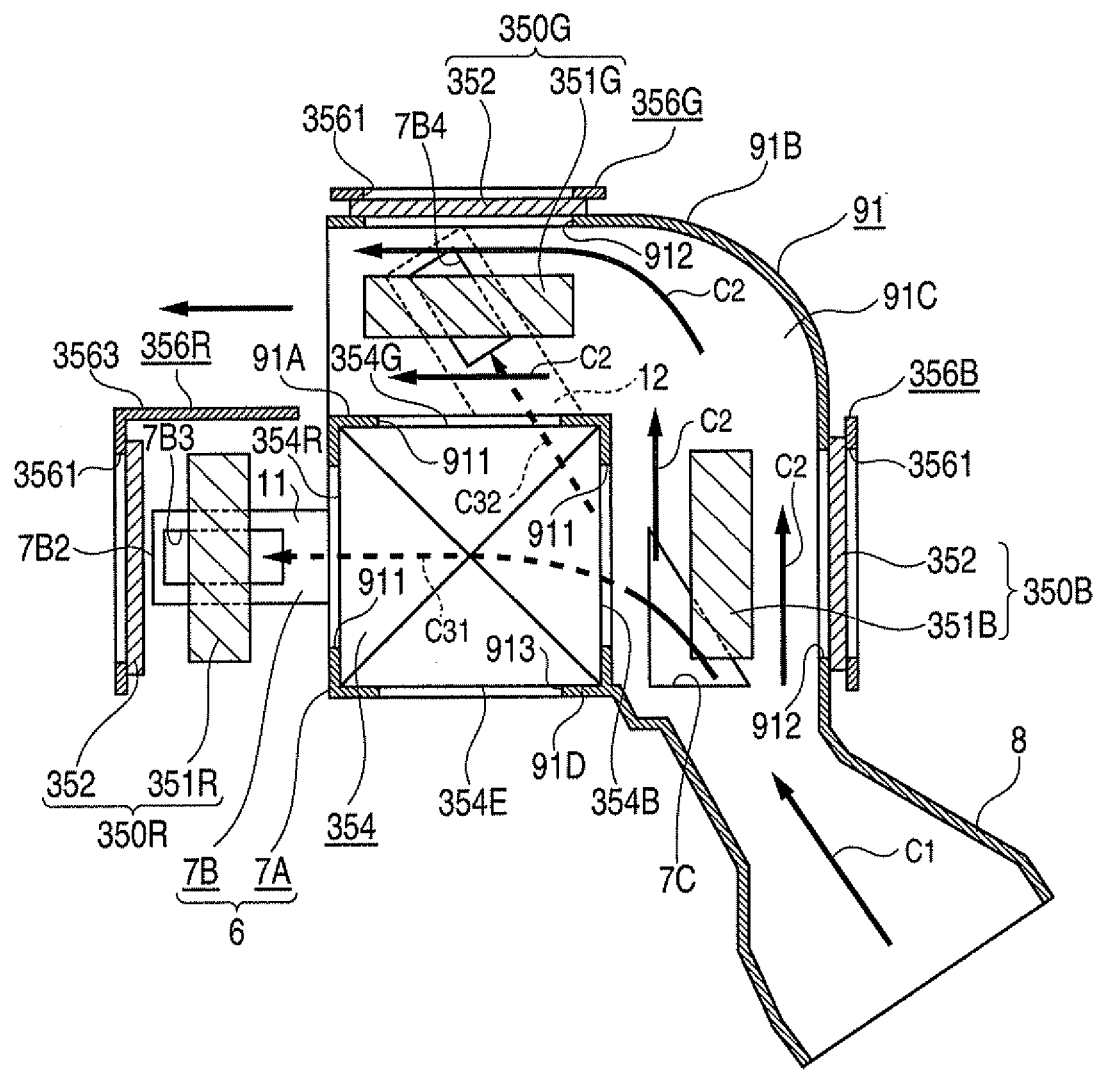
FIG. 8 illustrates channels of the duct according to the second embodiment.

FIG. 8 illustrates the channels of the duct 6 in the second embodiment. More specifically, FIG. 8 shows the cross section of the duct 6 cut along the horizontal plane passing through the inner peripheral wall 91A and the outer peripheral wall 91B as viewed from above.

In the following explanation, only the area of the channels of the duct 6 different from the corresponding area of the duct 6 in the first embodiment is touched upon.

The channel C3 through which air is introduced into the sub duct portion 7B via the communication port 7C is branched into two channels C31 and C32 by the respective branch duct portions 11 and 12 described above.

As illustrated in FIG. 8, air flowing along the channel C31 is guided toward the lower end of the R component 350R similarly to the first embodiment, and supplied toward the lower end of the liquid crystal panel 351R via the first outlet port 7B3.

On the other hand, air flowing along the channel C32 is guided toward the lower part of the liquid crystal panel 351G as illustrated in FIG. 8, and is introduced into the channel C2 via the second outlet port 7B4.

Then, the air introduced into the channel C2 is supplied toward the lower end of the liquid crystal panel 351G, and flows through the light entrance side and the light exit side of the liquid crystal panel 351G in the upward direction from below to cool the G component 350G.

As illustrated in FIG. 8, the channel C32 as the channel from which air flows into the channel C2 is so constructed as to cross the channel C2 at an acute angle according to the shape of the second branch duct portion 12 mentioned above, in the plan view as viewed in the vertical direction. Thus, the air delivered through the channel C32 and discharged to the outside of the sub duct portion 7B via the second outlet port 7B4 can be smoothly introduced into the channel C2.

According to the second embodiment, the following advantages can be offered as well as advantages similar to those of the first embodiment.

In this embodiment, the sub duct portion 7B has the respective branch duct portions 11 and 12. Thus, the G component 350G can be cooled by both the air flowing through the main duct portion 7A and the air supplied from the second branch duct portion 12.

Particularly, the G component 350G which requires a large quantity of air for cooling can be effectively cooled by using the sub duct portion 7B thus constructed.

Third Embodiment

A third embodiment according to the invention is hereinafter described with reference to the drawings.

In the following description, the same reference numbers are given to the same structures and parts as those in the first embodiment, and the same detailed explanation is simplified or not repeated.

Figure 9:
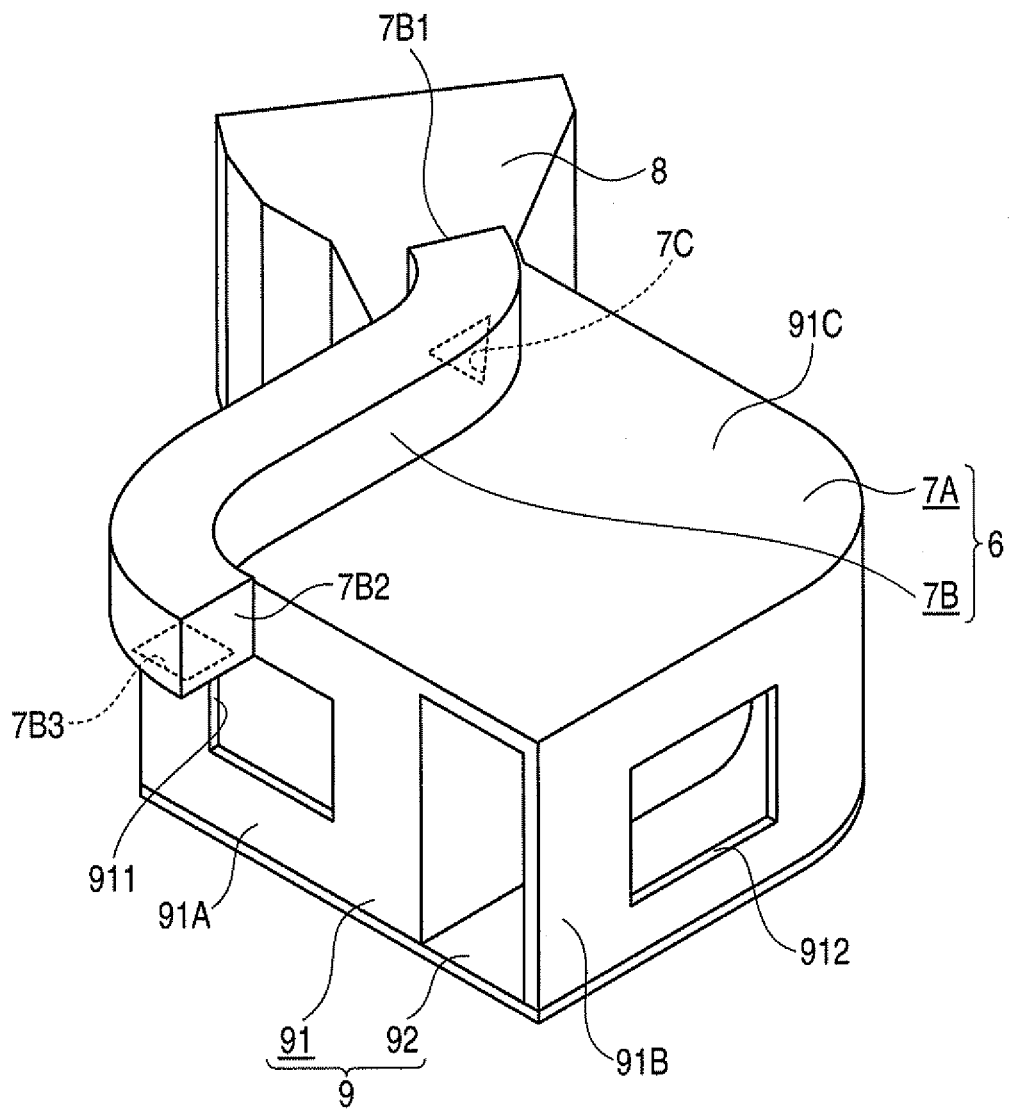
FIG. 9 schematically illustrates the structure of a duct according to a third embodiment.

FIG. 9 schematically illustrates the structure of the duct 6 in the third embodiment. More specifically, FIG. 9 is a perspective view of the rear side of the duct 6 as viewed from below.

The structure in this embodiment is the same as that in the first embodiment except that the construction of the polarizer support member 356R and the shape of the sub duct portion 7B are different from those in the first embodiment.

Figure 10:
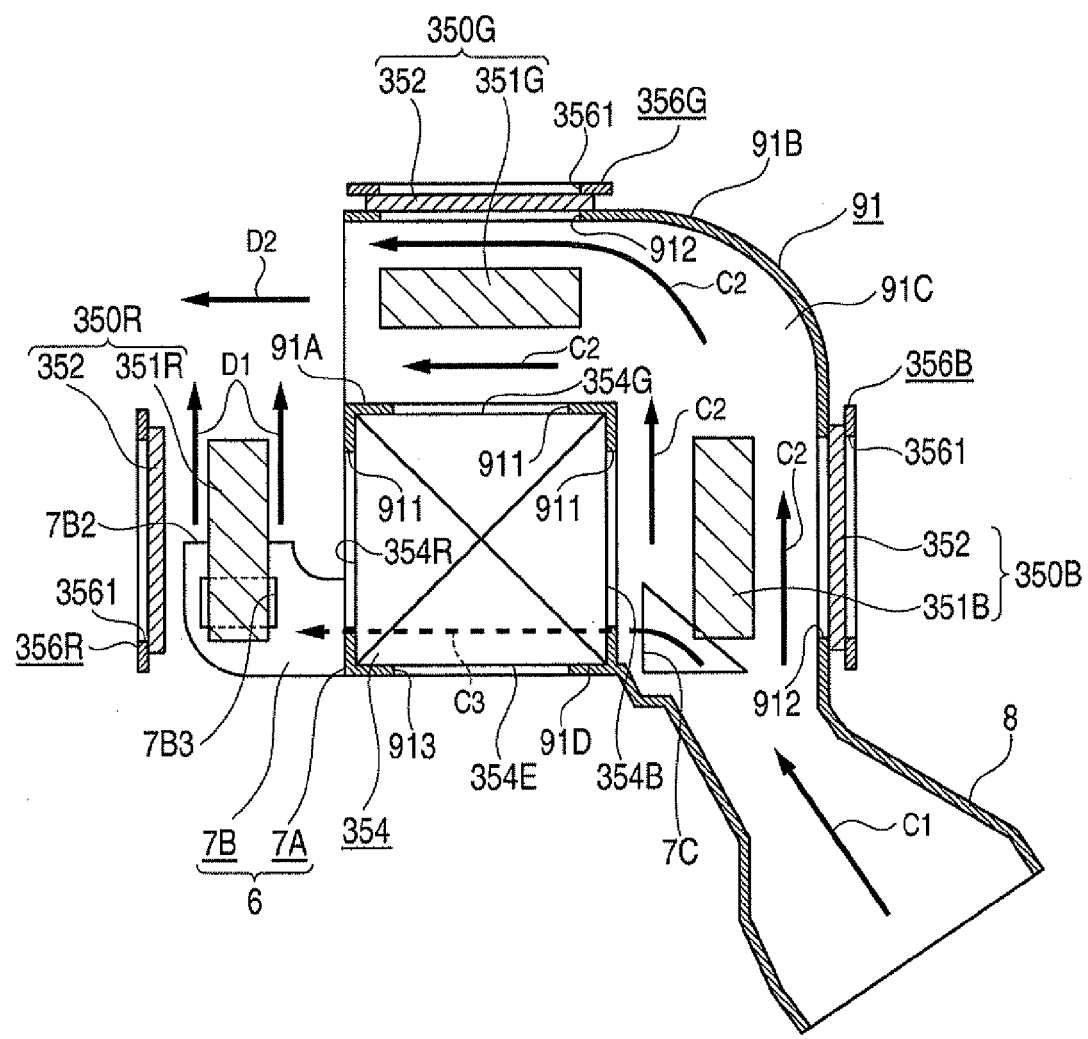
FIG. 10 illustrates channels of the duct according to the third embodiment.

More specifically, the polarizer support member 356R in the third embodiment does not have the light shield portion 3563 (see FIG. 10).

The sub duct portion 7B in the third embodiment linearly extends from the end 7B1 in the direction perpendicular to the entrance surface 354R in the plan view as viewed in the vertical direction. In this case, the end 7B2 extends toward the rear side (see FIG. 10).

The outlet port 7B3 formed on the end 7B2 is positioned on the front side of the R component 350R in the plan view as viewed in the vertical direction (see FIG. 10).

The channels of the duct 6 in the third embodiment are now explained.

FIG. 10 illustrates the channels of the duct 6 in the third embodiment. More specifically, FIG. 10 shows the cross section of the duct 6 cut along the horizontal plane passing through the inner peripheral wall 91A and the outer peripheral wall 91B as viewed from above.

In the following description, only the part different from the channels of the duct 6 explained in the first embodiment is touched upon.

As illustrated in FIG. 10 air flowing along the channel C3 is guided toward the lower end of the R component 350R, and is supplied toward the lower end of the liquid crystal panel 351R via the outlet port 7B3.

Then, the air supplied to the lower end of the liquid crystal panel 351R flows through the light entrance side and the light exit side of the liquid crystal panel 351R in the upward direction from below toward the rear side from the front side along the bended shape of the end 7B2 of the sub duct portion 7B explained above so as to cool the R component 350R.

That is, as illustrated in FIG. 10, a flow direction D1 of the air supplied from the channel C3 toward the liquid crystal panel 351R crosses a flow direction D2 of the air having passed through the channel C2.

According to the third embodiment, the following advantages can be offered as well as advantages similar to those of the first embodiment.

According to this embodiment, the sub duct portion 7B is provided in a state that the flow direction D1 of the air supplied from the channel C3 toward the liquid crystal panel 351R crosses the flow direction D2 of the air having passed through the main duct portion 7A.

In this case, flow of the air having passed through the main duct portion 7A and thus having a high temperature in the direction toward the R component 350R is blocked by the air supplied from the sub duct portion 7B. Thus, temperature increase of the R component 350R by the air having a high temperature after flowing through the main duct portion 7A can be avoided, allowing the R component 350R to be effectively cooled by the air flowing from the sub duct portion 7B.

Accordingly, the necessity of providing the light shield portion 3563 on the polarizer support member 356R is eliminated, which simplifies the shape of the polarizer support member 356R.

The invention is not limited to the respective embodiments described herein but may be practiced otherwise without departing from the scope of the invention. Therefore, various modifications and improvements including the following changes may be made.

According to the respective embodiments, the cooling fan 5 is constituted by a sirocco fan. However, the cooling fan 5 may be a turbo fan which has a plurality of vanes curved rearward with respect to the fan rotation direction, or an axial fan which introduces and discharges air along a fan rotation axis.

According to the respective embodiments, the sub duct portion 7B is disposed below the prism 354. However, the sub duct portion 7B may be disposed above the prism 354.

According to the respective embodiments, the B component 350B and the G component 350G are disposed on the channel C2 of the main duct portion 7A in this order from the upstream side of the channel C2. However, these components 350B and 350G may be disposed in the order of the G component 350G and the B component 350B.

According to the respective embodiments, the component referred to as a light shield plate in the appended claims is provided on the polarizer support member 356R. However, the light shield plate may be disposed on other components such as the support member 355 for R light and the optical component housing 37.

The position of the communication port 7C is not limited to the position specified in the respective embodiments but may be disposed at arbitrary positions. Considering the cooling efficiency for the R component 350R, it is preferable that the communication port 7C is so constructed as to communicate with the channels C1 and C2 formed between the B component 350B and the cooling fan 5.

According to the respective embodiments, the cross dichroic prism 354 is provided for combining the respective color lights in R, G, and B received from the respective components 350R, 350G, and 350B. However, a plurality of dichroic mirrors may be used for this function.

According to the respective embodiments, the projector 1 includes the three liquid crystal panels 351. However, the invention is applicable to a projector including two, or four or more liquid crystal panels.

The light modulation devices are not limited to the transmission type liquid crystal panels as in the respective embodiments but may be reflection type liquid crystal panels.

According to the respective embodiments, only the case of the front projection type projector has been discussed. However, the invention is applicable to a rear type projector which has a screen and projects images from the rear surface of the screen.

The technologies of the invention can be applied to a projector used for presentation, home theater, or for other purposes.

What is claimed is:

1. A projector comprising:
   a plurality of light modulation devices; and
   a cooling device;
   wherein
   the plurality of light modulation devices includes:
      a first light modulation device configured to correspond to the first color light,
      a second light modulation device configured to correspond to the second color light, and
      a third light modulation device configured to correspond to the third color light; and
   the cooling device includes:
      a cooling fan configured to introduce and discharge air, and
      a duct configured to guide air received from the cooling fan toward the plural light modulation devices; and
   the duct includes:
      a first duct portion configured to allow the air to flow along a first plane through the first light modulation device from sides of the first and second light modulation devices in adjacently disposed order in the first duct portion, and
      a second duct portion which communicates with the first duct portion and guides a part of the air flowing through the first duct portion along a second plane oriented below the first plane toward the third light modulation device.

2. The projector according to claim 1, further comprising:
   a color combining device that has a plurality of light entrance surfaces that receive respective color lights modulated by the plural light modulation devices, and combines the respective color lights,
   wherein the second duct portion is disposed so as to face an end surface of the color combining device crossing the plurality of light entrance surfaces.

3. The projector according to claim 1, wherein
   the plural light modulation devices have a red light modulation device for modulating red light, a green light modulation device for modulating green light, and a blue light modulation device for modulating blue light;
   the first duct portion allows air to flow through the green light modulation device and blue light modulation device; and
   the second duct portion guides air to the red light modulation device.

4. The projector according to claim 2, wherein
   the plural light modulation devices have a red light modulation device for modulating red light, a green light modulation device for modulating green light, and a blue light modulation device for modulating blue light;
   the first duct portion allows air to flow through the green light modulation device and blue light modulation device; and
   the second duct portion guides air to the red light modulation device.

5. The projector according to claim 4, wherein the green light modulation device and the blue light modulation device are disposed in order of the blue light modulation device and the green light modulation device from an upstream channel side of the first duct portion.

6. The projector according to claim 2, wherein the second duct portion has a first branch duct portion to guide air to the devices other than the two light modulation devices, and a second branch duct portion to guide air to a downstream side light modulation device of the two light modulation devices provided on the first duct portion.

7. The projector according to claim 1, further comprising a light shield plate that separates a downstream channel side light modulation device of the two light modulation devices provided on the first duct portion from the devices other than the two light modulation devices.

8. The projector according to claim 2, further comprising a light shield plate which separates a downstream channel side light modulation device of the two light modulation devices provided on the first duct portion from the devices other than the two light modulation devices.

9. The projector according to claim 1, wherein the second duct portion is provided in a state that a flowing direction of air being supplied through the second duct portion toward the devices other than the two light modulation devices crosses a flowing direction of air having passed through the two light modulation devices via the first duct portion.

10. The projector according to claim 2, wherein the second duct portion is provided in a state that a flowing direction of air supplied through the second duct portion toward the devices other than the two light modulation devices crosses a flowing direction of air having passed through the two light modulation devices via the first duct portion.

11. The projector according to claim 2, wherein a communication port formed on the second duct portion to communicate with the first duct portion is provided in such a condition that a part of the communication port overlaps with an upstream channel side light modulation device of the two light modulation devices provided on the first duct portion in plan view as viewed in a thickness direction of the projector.

12. A projector comprising:
a plurality of light modulation devices; and
a cooling device;
wherein
the plurality of light modulation devices includes:
    a first light modulation device configured to correspond to the first color light,
    a second light modulation device configured to correspond to the second color light, and
    a third light modulation device configured to correspond to the third color light; and
the cooling device includes:
    a cooling fan configured to introduce and discharge air, and
    a duct configured to guide air received from the cooling fan toward the plural light modulation devices; and
the duct includes:
    a first duct portion configured to allow the air to flow along a first plane through the first light modulation device and the second modulation device from sides of the first and second light modulation devices in adjacently disposed order in the first duct portion, and
    a second duct portion which communicates with the first duct portion and guides a part of the air flowing through the first duct portion along a second plane oriented above the first plane toward the third light modulation device.

* * * * *